(12) United States Patent
Kubota

(10) Patent No.: US 6,464,308 B2
(45) Date of Patent: Oct. 15, 2002

(54) BRAKING FORCE CONTROL APPARATUS

(75) Inventor: Masahiro Kubota, Yokohama (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 09/917,678

(22) Filed: Jul. 31, 2001

(65) Prior Publication Data

US 2002/0027387 A1 Mar. 7, 2002

(30) Foreign Application Priority Data

Sep. 6, 2000 (JP) ........................................ 2000-269560

(51) Int. Cl.[7] ........................... B60T 8/00; B60T 13/74; F16D 65/18
(52) U.S. Cl. ..................... 303/20; 188/162; 188/158; 188/72.1; 188/72.8; 188/1.11 L; 188/1.11 E; 303/3; 303/155
(58) Field of Search .................. 188/1.11 R, 1.11 E, 188/1.11 L, 162, 181 T, 72.1, 72.8, 72.7, 71.1, 158, 161, 71.8, 71.9; 701/70, 20, 93, 79; 303/115.2, 20, 3, 162, 199

(56) References Cited

U.S. PATENT DOCUMENTS 5,957,246 A * 9/1999 Suzuki ..................... 188/72.1
6,000,507 A * 12/1999 Böhm et al. ............ 188/1.11 E
6,279,694 B1 * 8/2001 Böhm et al. ............ 188/1.11 E

FOREIGN PATENT DOCUMENTS

| DE | 19536695 A1 | 4/1997 |
| DE | 19730094 A1 | 1/1999 |
| DE | 19826052 C1 | 2/2000 |
| JP | 9137841 A | 5/1997 |

OTHER PUBLICATIONS

Ralf Schwarz and Rolf Isermann; Clamping Force Estimation for a Brake–by–Wire Actuator; SAE Technical Paper Series; Mar. 1–4, 1999; 14 pages 1999–01–0482; Warrendale, PA, U.S.A.

* cited by examiner

*Primary Examiner*—Douglas C. Butler
(74) *Attorney, Agent, or Firm*—Shinjyu Global IP Counselors, LLP

(57) ABSTRACT

A braking force control apparatus is provided that controls the motor displacement to obtain a braking force that corresponds to the pedal depressing force. The braking force control apparatus detects the initial contact point between the pads and the rotor, which changes due to wear and heat deformation. The braking force control apparatus also adjusts a motor displacement command to enable an accurate braking force control. The braking force control apparatus detects the initial contacting point by detecting the electrical current value of the motor. When the motor is driven at a constant speed to contact the pads against the rotor, the electrical current value is stable. Thus, the initial contacting point is detected by using the motor displacement at the time when the electrical current value increases and becomes equal to or greater than the initial threshold value.

20 Claims, 10 Drawing Sheets

BRAKING FORCE CONTROL APPARATUS

BACKGROUND OF THE INVENTION

1. Field of the Invention

The present invention generally relates to a control apparatus for a braking system. More specifically, the present invention relates a braking force control apparatus that generates a braking force by pushing and separating a brake pad toward and apart from a brake rotor through a driving device.

2. Background Information

In a control apparatus for a braking system, a driving state of a motor is controlled by detecting a depressing force exerted on a brake pedal by a driver, such that the braking force that corresponds to the depressing force is generated. One of the methods of estimating the braking force is disclosed in the SAE 1990-01-0482. This braking force estimation method utilizes the rigidity of the caliper that supports pads. The braking force is estimated based on the amount of displacement of the motor from a point where the rotor and the pads initiated a contact. More specifically, since there is a certain relationship between the amount of displacement of the motor and the braking force determined by the caliper rigidity once the pads and the rotor start contacting, the braking force can be controlled by controlling the amount of motor displacement. However, the amount of motor displacement includes a portion that eliminates the clearance between the pads and the rotor. In other words, the amount of motor displacement includes the portion in which the motor moves in the pressuring direction until the pads and the rotor contact each other, and a portion in which the motor moves after the pads and the rotor start contacting. The aforementioned relationship between the braking force and the amount of motor displacement determined by the caliper rigidity exists only in the latter portion. Therefore, in order to obtain from the total amount of motor displacement, the amount of motor displacement occurring after the pads start contacting the rotor, it is necessary to eliminate precisely the portion in which the motor starts moving in the pushing direction until the pads start contacting the rotor. Therefore, it is necessary to detect the precise point at which the pads and the rotor start contacting.

One of the control apparatuses that control the braking force by detecting the position at which the pads and the rotor start contacting is disclosed in Japanese Laid-Open Patent Application H9-137841. In this control apparatus, an axial force sensor is attached to a piston that pushes and separates the pads toward and apart from each other. While the piston is moving in a direction that separates the pads apart from each other (i.e., the braking force is released), the initial contacting point of the pads and the rotor is determined as the point at which the axial force detected by the axial force sensor is zero.

In view of the above, there exists a need for a control apparatus which overcomes the above mentioned problems in the prior art. This invention addresses this need in the prior art as well as other needs, which will become apparent to those skilled in the art from this disclosure.

SUMMARY OF THE INVENTION

It has been discovered that the preciseness of the axial force sensor disclosed in Japanese Laid-Open Patent Application H9-137841 would tends to be compromised under actual operating conditions. In particular, the preciseness of the detection of the axial force by the axial force sensor tends to be compromised because a change in property due to temperature changes and noise or degradation from vibration.

The present invention has been conceived in view of the aforementioned problems. More specifically, an object of the invention is to provide a control apparatus that can control braking force accurately by accurately detecting an initial contacting point of the pads (the brake friction body) and the rotor (the brake rotational body) without using an axial force sensor.

In order to achieve the aforementioned object, a braking force control apparatus is provided that includes a driving device, an operational status detector, an initial contact position detector and a brake control unit. The driving device is operatively configured to move a brake pad towards and away from a brake rotor. The operational status detector is arranged to detect an operational status of the driving device. The initial contact position detector is arranged to detect an initial contacting point between the brake pad and the brake rotor based on the operational status of the driving device detected by the operational status detector, when the driving device moves the brake pad toward the brake rotor. The brake control unit is operatively coupled to the driving device and the operational status detector to control the driving device. The brake control unit includes a brake command value setting portion that is configured to set a brake command value to control the driving device based on a pedal operation amount. The brake control unit further includes an adjustment portion configured to subsequently adjust the brake command value based on the initial contacting point between the brake pad and the brake rotor detected by the initial contact position detector.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following description of the embodiments of the present invention is provided for illustration only, and not for the purpose of limiting the invention as defined by the appended claims and their equivalents.

Figure 1:
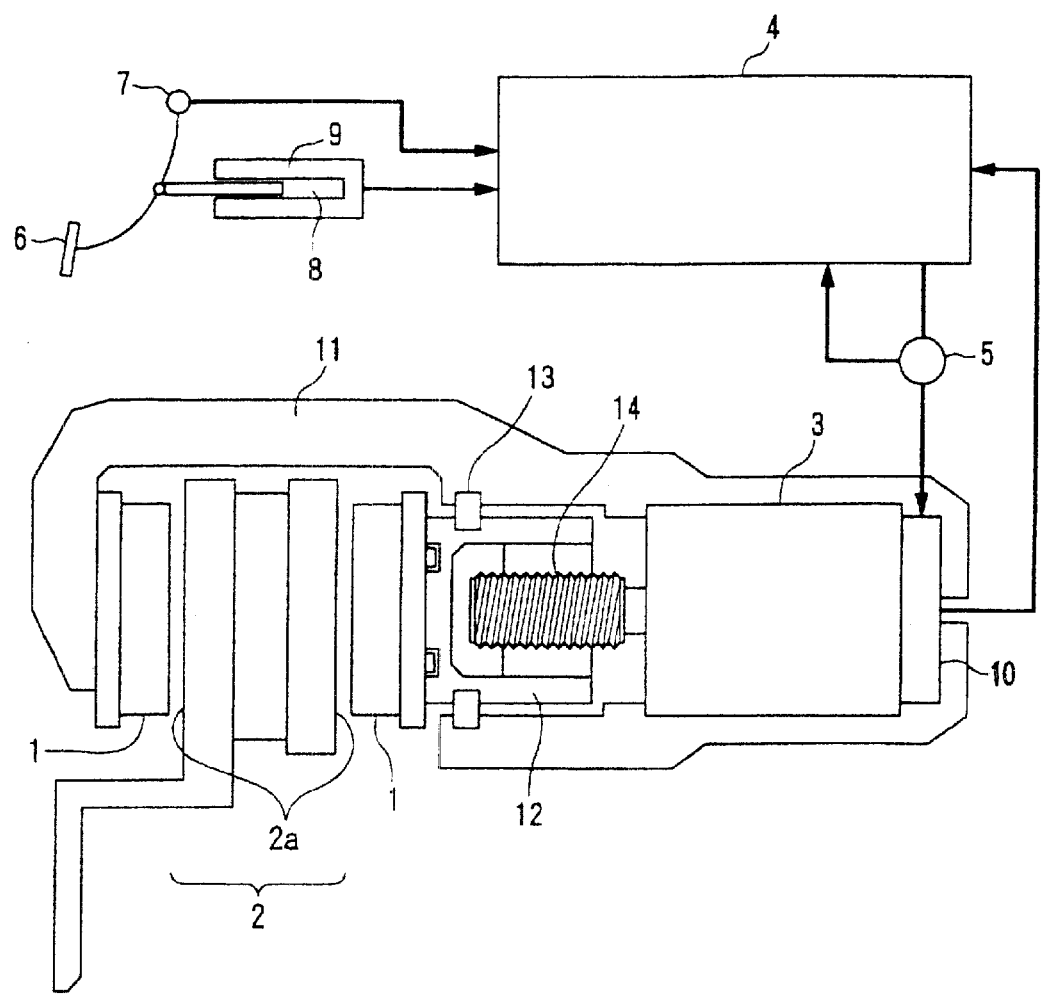
FIG. 1 is a schematic structural view of a braking force control apparatus in accordance with one embodiment of the present invention.

Referring initially to FIG. 1, a braking force control apparatus is diagrammatically illustrated with a disc brake assembly to explain a first embodiment of the present invention. The disc brake assembly basically includes a pair of brake pads 1 and a rotor 2 located between the pads 1. The pads 1 form the brake friction body, while the rotor 2 forms the brake rotational body. The rotor 2 rotates with wheels of a vehicle that is not shown in the Figures. On the other hand, the two pads 1 are disposed within a caliper 11 with the rotor 2 located between the pads 1 so that the opposed pressure surfaces 2a face the corresponding friction surfaces of the pads 1. A vehicle body side that is not shown in the Figure supports the caliper 11 in a conventional manner. The pad 1 located on the left-hand side is fixed within the caliper 11, while a piston 12 is coupled to the pad 1 located on the right-hand side. A female threaded bore is formed on the piston 12. A male threaded screw 14 is threadedly coupled to this female threaded bore of the piston 12. The male threaded screw 14 is attached to a rotational axis of the motor 3. Therefore, as the motor 3 is rotated in either the clockwise direction or the counter-clockwise direction, the piston 12 moves back and forth in the axial direction due to the thrust force of the threads. Therefore, the pad 1 on the right-hand side of FIG. 1 moves close to and apart from the pressure surface 2a of the rotor 2. The caliper 11 is supported by the vehicle body side to be movable in the left to right direction as seen in FIG. 1. Therefore, as the pad I on the right-hand side of FIG. 1 contacts the rotor 2, and thereby is pushed, the caliper 11 moves toward the upper right-hand side as seen in FIG. 1. Accordingly, the pad 1 on the left-hand side also contacts the rotor 2 and thereby is pushed. Conversely, when the pushing force to the right-hand side, the pad 1 is released. Thus, the pushing force to the left-hand side the pad 1 is also released. As the right-hand side the pad 1 separates apart from the rotor 2, the left pad 1 also separates apart from the rotor 2. A seal 13 is provided in between the piston 12 and the caliper 11. As the pads 1 are pressed against the rotor 2 to generate a braking force, the pads 1 and the rotor 2 begin to wear. However, in general, the pads 1 wear more than the rotor 2.

The motor 3 is driven by a drive control signal from a control unit 4, which controls the rotational direction, speed, and driving force of the motor 3. The control unit 4 functions as brake controlling device. Adjusting the electrical current value of a drive control signal generally controls the rotational direction, speed, and driving force of the motor 3. In this embodiment, an electrical current value I of a drive control signal to the motor 3 is detected by an electrical current value sensor 5, and feed-backed to the control unit 4. Also, a displacement sensor 10 that detects the displacement of the piston 12 from the rotational amount of the motor 3 is provided in the motor 3. The control unit 4 inputs an output signal from this the displacement sensor 10 as a displacement X of the motor 3. The motor displacement X takes a positive value when the piston 12 and the pads 1 move closer to and push the rotor 2. The displacement sensors are conventional components that are well known in the art. Since displacement sensors are well known in the art, the displacement sensor 10 will not be discussed or illustrated in detail herein. Therefore, the displacement sensor 10 should include any structure that can be utilized to carry out the function of the displacement sensor 10 of the present invention.

In this motor control apparatus, the brake pedal 6 and the piston 12 are not connected by a conventional pressure distribution pipe. In this embodiment, the brake pedal 6 is nothing more than an input source from which the depression stroke of the pedal 6 and its depressing force are to be detected. In other words, a pedal operation amount by a driver and a vehicle behavior are detected and inputted to the control unit 4 as the pedal depressing force F and the pedal stroke S. The brake pedal 6 is provided with a conventional brake switch 7, a depressing force sensor 8, and a stroke sensor 9. The outputs from the brake pedal 6, the brake switch 7, the depressing force sensor 8, and the stroke sensor 9 are inputted into the control unit 4. Additionally, the pedal stroke S detected by the stroke sensor 9 and the pedal depressing force F detected by the depressing force sensor 8 take positive value in the direction of depressing the brake pedal 6. The depressing sensors and stroke sensors are conventional components that are well known in the art. Since depressing force sensors and stroke sensors are well known in the art, the depressing force sensor 8 and the stroke sensor 9 will not be discussed or illustrated in detail herein. Moreover, the depressing force sensor 8 and the stroke sensor 9 should include any structure that can be utilized to carry out the functions of the depressing sensor 8 and the stroke sensor 9 of the present invention.

Figure 2:
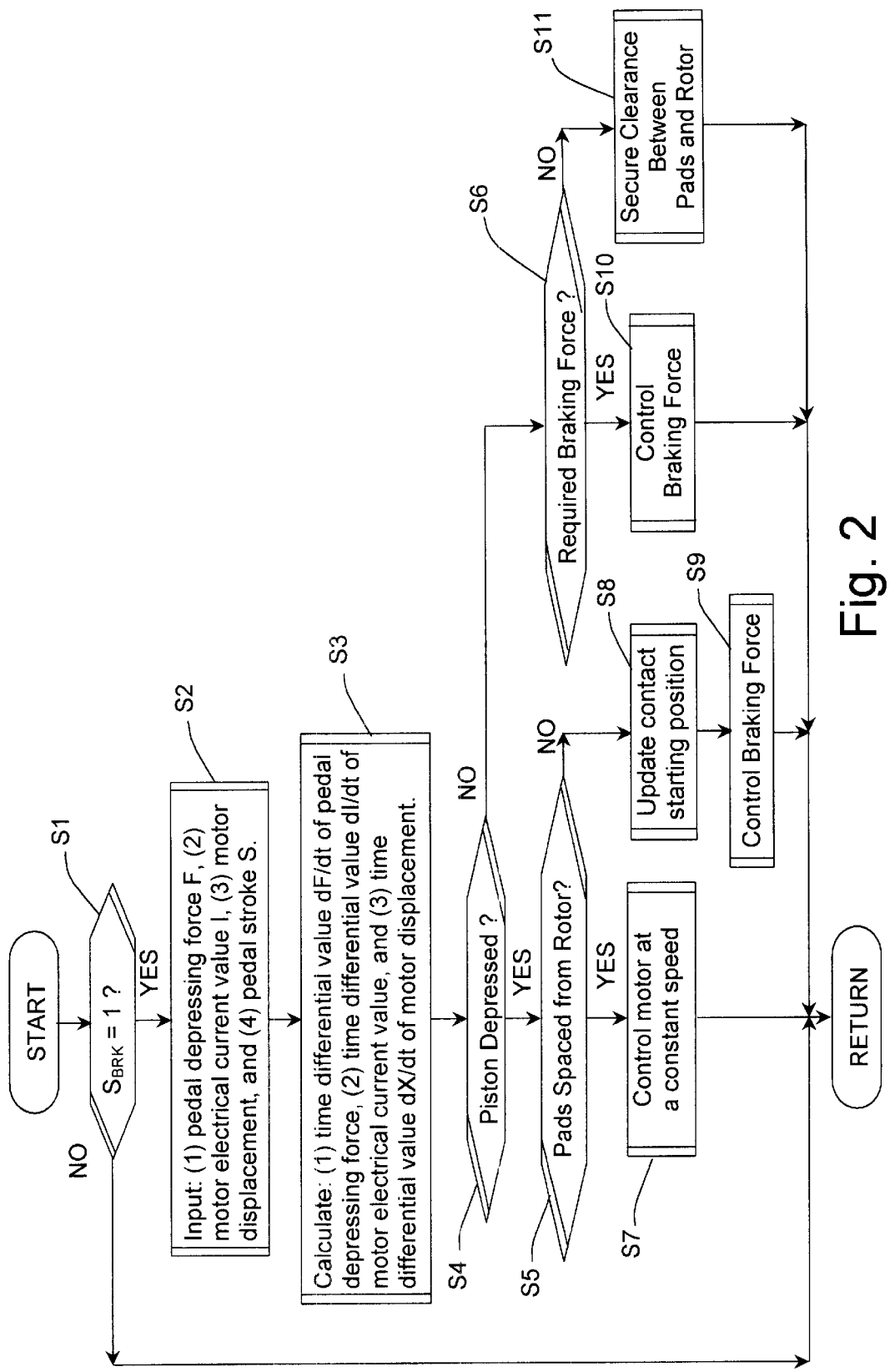
FIG. 2 is a flowchart of a calculation process performed within a control unit of the braking force control apparatus shown in FIG. 1.

The control unit 4 preferably includes a microcomputer with a braking force control program that controls the motor 3 which in turn controls the braking force of the pads 1 against the rotor 2 and adjusts for wear in the pads 1 and the rotor 2, as discussed below. The control unit 4 also preferably includes other conventional components such as an input interface circuit, an output interface circuit, calculation processing devices and storage devices such as a ROM (Read Only Memory) device and a RAM (Random Access Memory) device. The memory circuits store processing results and control programs such as ones for the calculation process that is shown in FIG. 2. In this manner, the microcomputer of the control unit 4 controls the motor 3. The control unit 4 is operatively coupled to the motor 3 in a conventional manner. The control unit 4 is capable of selectively controlling any of the components of the if needed and /or desired. It will be apparent to those skilled in the art from this disclosure that the precise structure and algorithms for control unit 4 can be any combination of hardware and software that will carry out the functions of the present invention. In other words, the control unit 4 functions as a controlling device for carrying out the present invention. In view of the current state of-the art, all "means plus function" clauses as utilized in the specification and claims should include any structure or hardware and/or algorithm or software that can be utilized to carry out the function of the "means plus function" clause.

Now, the calculation process for drive controlling the motor 3 shown in FIG. 2 will be explained. This calculation process is performed as a timer interrupt process performed every predetermined period of time ΔT (for instance 10 msec.). Although there is no separate step for communication in this flowchart, data obtained by calculation is always stored. The stored data is read by the control unit 4 as needed to carry out the present invention.

During this calculation process, in step S1, the control unit 4 determines the status of the brake switch 7 by checking the logical value of a brake switch signal $S_{BRK}$ received from the brake switch 7. When the brake switch signal $S_{BRK}$ has its logical value equal to "1", the brake switch 7 is in the ON state. If the brake switch signal $S_{BRK}$ has the logical value "1", then the braking force control program proceeds to step S2. Otherwise, the braking force control program returns to the main program.

In the step S2, the control unit 4 receives signals indicative of the motor electrical current value I, the pedal depressing force F, the pedal stroke S and the motor displacement X from the various sensors 5, 8, 9 and 10, respectively. Thus, the pedal depressing force F from the depressing force sensor 8 and the pedal stroke S from the stroke sensor 9 are read into memory of the control unit 4, based on each calculation process performed within the step S2. Also, the motor electrical current value I from the electrical current value sensor 5 and the motor displacement X from the displacement sensor 10 are read into memory of the control unit 4, based on each calculation process performed within the step S2. Then, the braking force control program proceeds to step S3.

In the step S3, a time differential value dF/dt of the pedal depressing force F is calculated from the pedal depressing force F that has been read in during the step S2, based on a calculation process performed within the step S3. Also, a time differential value dI/dt of the motor electrical current value I and a time differential value dX/dt of the motor displacement X are calculated, based on each calculation process performed within the step S3 using the values obtained from the sensors 5 and 10. Then, the braking force control program proceeds to step S4.

In the step S4, the control unit 4 determines whether the pedal has been depressed and calculates the values of the pedal stroke S, the pedal depressing force F and the time differential value dF/dt of the pedal depressing force. Thus, the control unit 4 determines whether the pedal stroke S has a positive value, whether the pedal depressing force F has a positive value, and whether the time differential value dF/dt of the pedal depressing force is greater than "0", based on each calculation process performed within the step S4 using the values obtained from the sensors 5, 8, 9 and 10. In this manner, the control unit 4 determines whether the piston 12 is currently moving in the direction to be pushed towards the rotor 2. If the piston 12 is being pushed towards the rotor 2, the braking force control program proceeds to step S5. Otherwise, the braking force control program proceeds to step S6.

In the step S5, the control unit 4 determines whether or not the pads 1 and the rotor 2 are contacting each other, based on each calculation process performed within the step S5 using the values obtained from the sensors 5, 8, 9 and 10. If the pads 1 and the rotor 2 are not contacting each other, the braking force control program proceeds to step S7. Otherwise, the braking force control program proceeds to step S8. The initial contacting point determination of the pads 1 and the rotor 2 will be described in detail later.

In step S7, a drive control signal is generated based on each calculation process performed within the step S7 using the values obtained from the sensors 5, 8, 9 and 10. The drive control signal controls the motor 3 at a constant speed, while the pads 1 and the piston 12 move toward the rotor 2. Then, the braking force control program returns to the main program. This constant speed control is set so as to correspond to the maximum speed of the motor 3.

On the other hand, in the step S8, the motor displacement X at the time of detecting a contact between the pads 1 and the rotor 2 is regarded as the initial contacting point of the pads 1 and the rotor 2, based on each calculation process performed within the step S8 using the values obtained from the sensors 5, 8, 9 and 10. Accordingly, the initial contacting point of the pads 1 relative to the rotor 2 is regularly updated. Then, the braking force control program proceeds to step S9.

In the step S9, the braking force is controlled. In other words, the drive control is performed in accordance with a control map shown in FIG. 3, based on each calculation process performed within the step S9 using the values obtained from the sensors 5, 8, 9 and 10. The control map will be described later. Then, the braking force control program returns to the main program.

In the step S6, the control unit 4 determines whether the pedal depressing force F read in during the step S2 is greater than a predetermined value, based on a calculation process performed within the step S6. In this manner, the control unit 4 determines whether the braking force needs to be currently generated. In other words, it is determined whether braking force is needed. If a braking force is needed, the braking force control program proceeds to step S10. Otherwise, the braking force control program proceeds to step S11.

In the step S10, as in the step S9, the control unit 4 performs a drive control operation to the control of the braking force. This drive control operation of the braking force is performed based on each calculation process performed within the step in accordance with the control map in FIG. 3 that uses the values obtained from the sensors 5, 8, 9 and 10. The control map of FIG. 3 will be described later. Then, the braking force control program returns to the main program.

In the step S11, a pads-rotor clearance securing control is performed based on each calculation process performed within the step. Then, the braking force control program returns to the main program. In this embodiment, the pads-rotor clearance securing control is a drive control operation of the motor 3 that returns the movable side the pad 1 and the piston 12 to the return end. The return end functions as the starting position of the motor 3 for the braking force control program. At the return end, there is a clearance between the pads 1 and the rotor 2, which is greater than a predetermined value.

Figure 3:
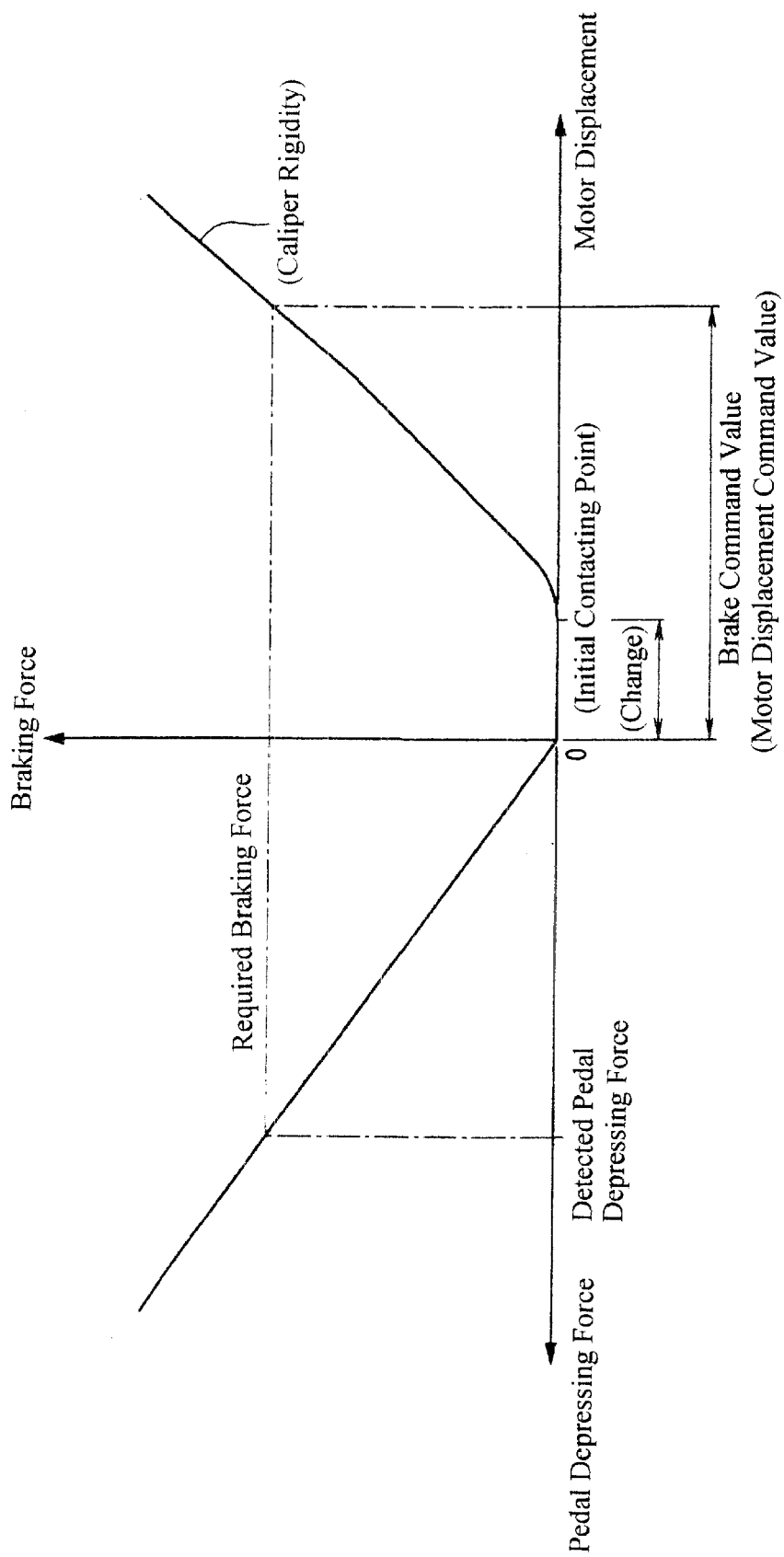
FIG. 3 is a control map showing the relationship between the pedal depressing force and the motor displacement command value, which is the brake command value.

Now, the control map of FIG. 3 that is referred to in the step S9 or the step S10 of the calculating process shown in FIG. 2 will be explained. The left-half side of FIG. 3 shows the relationship between the pedal depressing force F by the driver and the desired braking force that the driver wants. The right-hand side of FIG. 3 shows the relationship between the motor displacement X and the braking force to be generated. Basically, the braking force and the motor displacement X of the motor 3, which moves the piston 12 in the aforementioned manner and pushes the pads 1 toward the rotor 2, satisfy a predetermined relationship determined by a caliper rigidity. Therefore, once the pedal depressing force F by the driver is obtained, the motor displacement X that achieves the requisite braking force is determined. By regarding the motor displacement X as a brake or motor displacement command value, a drive control operation signal that corresponds to the motor displacement command value is generated and outputted. However, as described above, the pads 1 and piston 12 are returned to the returning end point in each control operation. That is, a clearance is secured between the pads 1 and the rotor 2 at the end of the braking cycle. The size of the clearance becomes greater as the pads 1 wear. Therefore, the position of motor displacement changes as the braking force is generated and as the braking force increases according to a predetermined relationship determined by the caliper rigidity. In other words, it is necessary to accurately detect the initial contacting point of the pads 1 and the rotor 2, and to adjust the motor displacement command value, based on the current relative positions of the pads 1 and the rotor 2. This portion of the braking force control apparatus functions as an adjustment device of the present invention.

Figure 4:
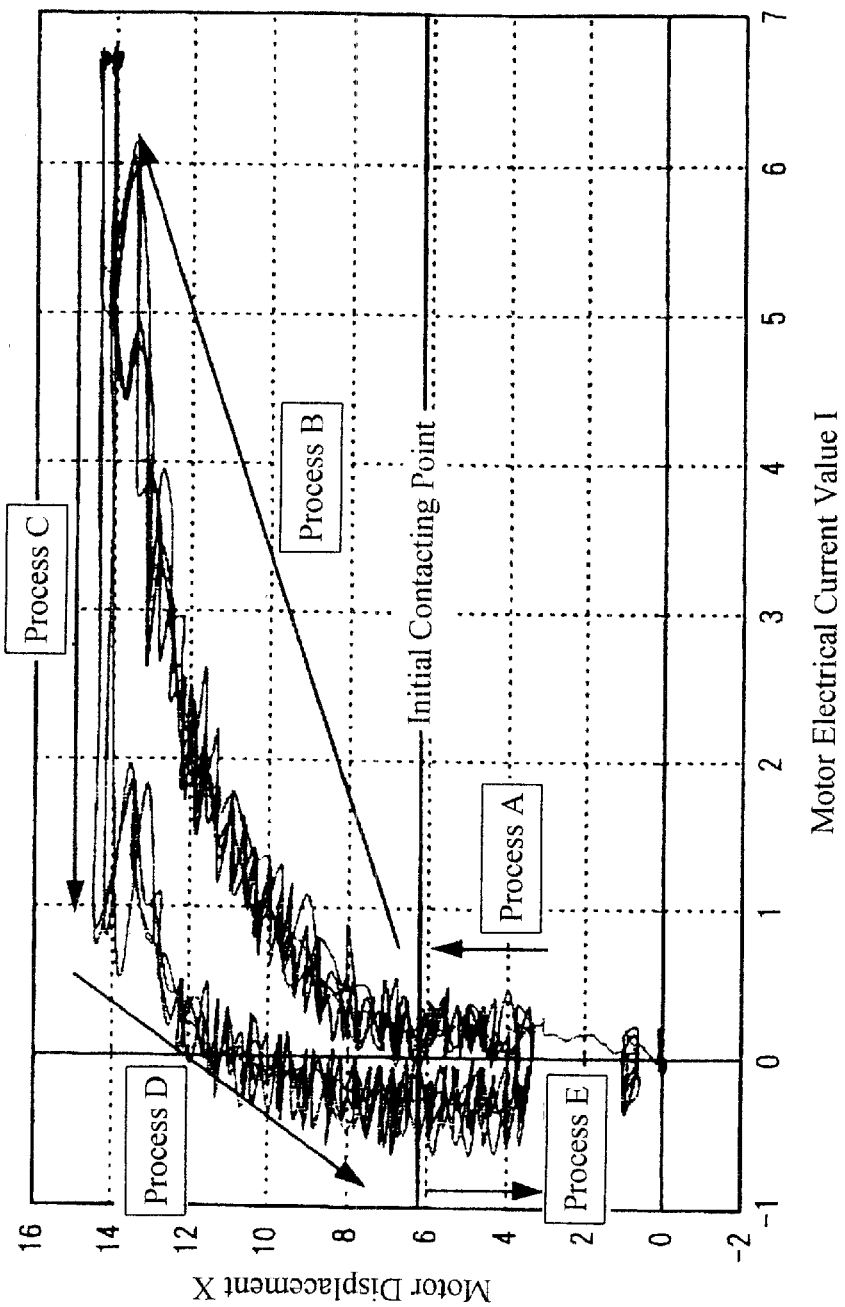
FIG. 4 is a graph showing the measurements of the motor electrical current value and the motor displacement.

The actual measurements of the motor displacement and the motor electrical current value are shown in FIG. 4. In FIG. 4, the process A is a process in which the clearance is being narrowed from the clearance at the returning end point. This portion corresponds to the step S7 of the calculation process shown in FIG. 2. In this portion, the motor 3 is driven by the control unit 4 at a constant speed. At this time, the motor electrical current value I has a constant value that is equivalent to the frictional resistance at each portion. Accordingly, the motor displacement increases substantially at a constant rate. The process B in FIG. 4 is a process in which the pads 1 contact the rotor 2 and are further pushed to control the braking force therebetween This portion corresponds to the step S9 in the calculation process shown in FIG. 2. At this time, the motor displacement becomes smaller gradually as time passes. At the same time, the motor electrical current value becomes greater gradually. However, it is assumed that both of them increase in a substantially linear manner. The process C in FIG. 4 is a process in which the pads 1 are shifted from a pushing status to a returning direction. The process D is a process in which the pushing pressure of the pads 1 is gradually decreased. These two processes correspond to the step S10 of the calculation process of FIG. 2. Out of these processes, the process C changes the rotational direction of the motor 3. Due to friction in each portion that has increased in response to an increase in the load, the motor displacement hardly changes. Only the motor electrical current value I decreases. In the process D, the motor displacement valve X decreases while the motor electrical current value I also decreases. However, the inclination of the decrease in the value obtained by dividing the motor electrical current value I with the motor displacement X is smaller than the inclination of the increase in the process B as an absolute value. In other words, the inclination of the decrease is less steep. This is due to the relationship between an opposite rotation transmission efficiency (transmission efficiency in the direction of separating the pads 1 apart from the rotor 2) and a normal rotational transmission efficiency (transmission efficiency in the direction of pushing the pads 1 toward the rotor 2). In other words, the inclination of the decrease is a less steeper one. The process E in FIG. 4 is a process in which the contact between the pads 1 and the rotor 2 has ended, and a clearance is secured by separating the pads 1 apart from the rotor 2. This process corresponds to the step S11 of the calculation process shown in FIG. 2. In this process, a constant motor electrical current value I runs in the direction opposite the direction of the aforementioned process A. This motor electrical current value I differs from the motor electrical current value I of the process A by a predetermined electrical current value. Therefore, the motor electrical current value I of the process A in the subsequent control can be estimated by at least adding this predetermined electrical current value to the motor electrical current value I of the process E in the preceding drive control operation. Additionally, there is only a slight difference between the inclinations in the process D and the process E. Therefore, it is difficult to detect the initial contacting point (more precisely, the contact ending position in this case) based on a manner in which the motor electrical current value I changes, as will be described later. Therefore, in this invention, the initial contacting point of the pads 1 and the rotor 2 is detected in between the aforementioned process A and process B.

Figure 5:
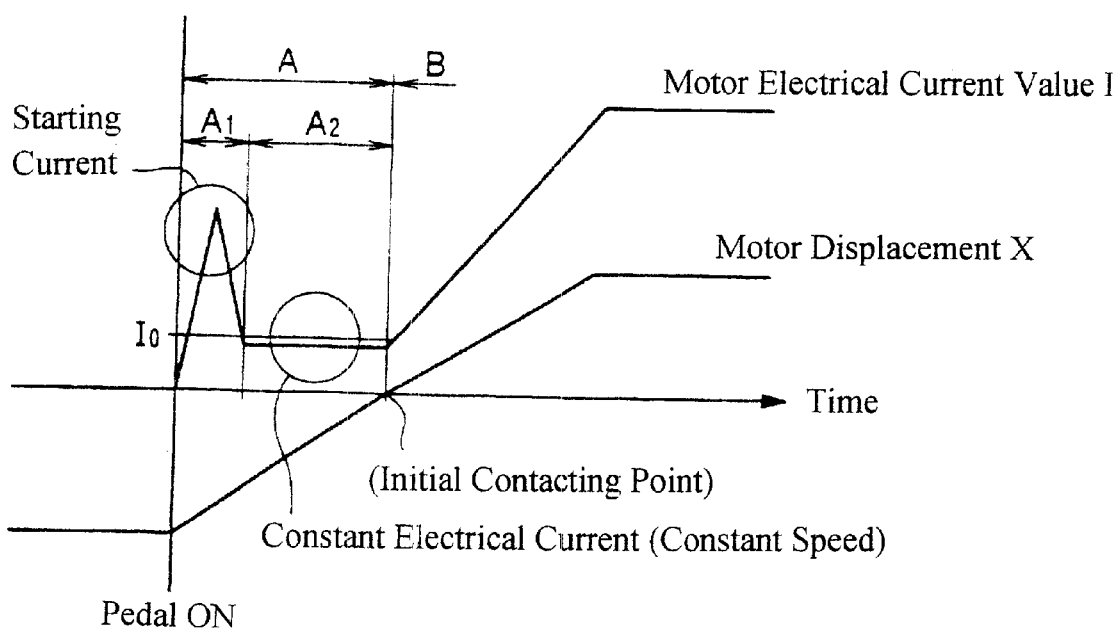
FIG. 5 is a timing graph showing of the time-series change in the motor electrical current value and the motor displacement.

FIG. 5 shows the motor electrical current value I and the motor displacement X in the aforementioned process A and process B, one next to the other in the time-series axis. As described above, the motor electrical current value I is almost constant in the process A. In the process B, since the motor electrical current value I starts increasing once the pads 1 and the rotor 2 contact each other, a predetermined threshold value ($I_0$) is determined, such that the predetermined threshold value $I_0$ is slightly greater than the constant motor electrical current value I in the process A. Then, the motor displacement X at which the motor electrical current value I becomes equal to or greater than the predetermined threshold value $I_0$ is determined as the initial contacting point of the pads 1 and the rotor 2. In order to accurately detect the initial contacting point of the pads 1 and the rotor 2 based on the change of the motor electrical current value I, the motor 3 should be driven at a constant speed in the process A so as to keep the motor electrical current value I in a stable state. Then, by detecting the initial contacting point of the pads 1 and the rotor 2, it is possible to perform a more precise braking force control.

Since the pads 1 wear every time a drive control operation is performed, the initial contacting point of the pads 1 and the rotor 2 always changes toward the side in which the motor displacement X is greater. In other words, up to the initial contacting point of the pads 1 and the rotor 2 detected in the preceding drive control operation, the pads 1 and the rotor 2 do not contact each other in the subsequent drive control operation. Also, as described above, the motor electrical current value I during the process E at the time of releasing the preceding drive control operation differs from the motor electrical current value I during the process A at the time of subsequent drive control operation by a predetermined electrical current value. Therefore, at the time of releasing the preceding drive control operation, the motor electrical current value I at the time when the pads 1 separate apart from the rotor 2 is stored, while the motor displacement X is equal to or smaller than the initial contacting point of the pads 1 and the rotor 2 detected during the preceding drive control operation. Then, the predetermined threshold value Io is set as a sum of the motor electrical current value I during the process A and in the subsequent drive control operation and the predetermined electrical current value, such that the threshold value $I_0$ is slightly greater than the motor electrical current value I in the process A. Then, the motor displacement X at which the motor electrical current value I in the process A becomes equal to or greater than the predetermined threshold value $I_0$ is determined as the initial contacting point of the pads 1 and the rotor 2. In this manner, the threshold value $I_0$ can be determined in accordance with the most recent drive control operation. Therefore, it is possible to detect the initial contacting point of the pads 1 and the rotor 2 even more precisely. Accordingly, it is possible to perform even more precise braking control.

Similarly, in the subsequent drive control operations, the pads 1 and the rotor 2 do not contact each other up to the initial contacting point of the pads 1 and the rotor 2 detected in the preceding drive control operation. Accordingly, based on this theory, the motor electrical current value I is detected from the point where drive control operation of the motor 3 is started in order to push the pads 1 toward the rotor 2, until the initial contacting point of the pads 1 and the rotor 2 detected in the preceding drive control operation is reached. The predetermined threshold value is determined by adding a predetermined constant value to the motor electrical current value I so detected. In this way, the threshold value can be determined based on the current operational state of the motor 3. Therefore, it is possible to detect the initial contacting point of the pads 1 and the rotor 2 even more accurately. Accordingly, it is possible to perform a more precise braking control.

When the drive control operation is started from a state in which the motor 3 is stopped, a so-called starting current is generated. In other words, as shown in FIG. 5, the aforementioned process A can be divided into a process $A_1$, during which the starting current is generated, and a process $A_2$, during which the motor electrical current value I becomes constant after the starting current is over. In the process $A_1$, during which the starting current runs, the initial contacting point of the pads 1 and the rotor 2 cannot be detected based on the motor electrical current value I. The duration of time during which the starting current runs is determined by various factors of the motor 3. Therefore, the motor electrical current value I is ignored for a predetermined period of time after the drive control operation of the motor 3 is started in order to push the pads 1 toward the rotor 2. Thereafter, the initial contacting point of the pads I and the rotor 2 should be detected based on the motor electrical current value I, preferably after the motor electrical current value I enters the constant period, in other words the process $A_2$.

Figure 6:
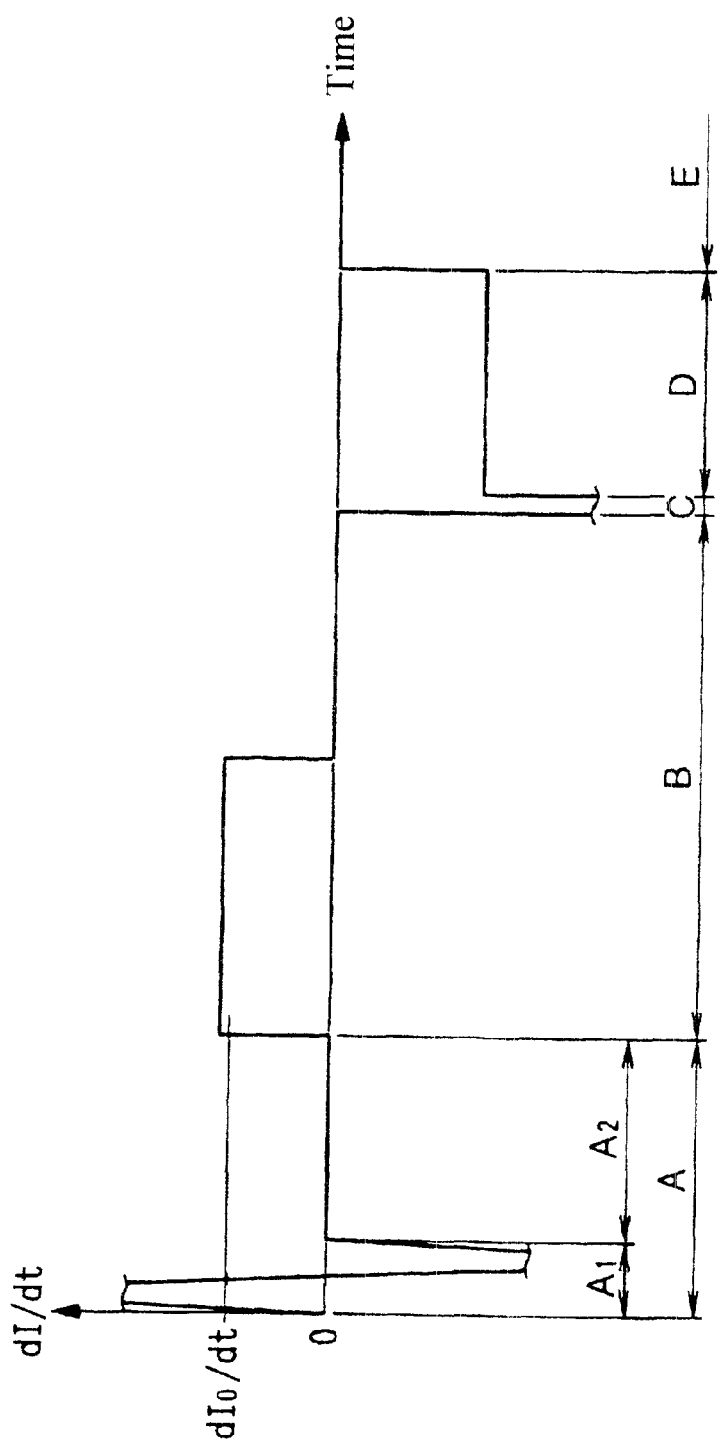
FIG. 6 is a timing graph showing of the time-series change in the time differential value of the motor electrical current value.

Next, other structures that detect the initial contacting point of the pads 1 and the rotor 2 will be explained. FIG. 6 shows a time-series change of the time differential value dI/dt of the motor electrical current value I within one drive control operation. In FIG. 6, the processes $A_1$, $A_2$, and A–E correspond to steps in FIG. 4 and FIG. 5. As described above, the motor electrical current value I remains constant in the process A (more precisely process $A_2$), while the motor electrical current value I increases linearly in the process B. Therefore, at the time of shifting from the process A to the process B, in other words at the initial contacting point of the pads 1 and the rotor 2, the time differential value of the motor electrical current value dI/dt increases in a rectangular manner. Therefore, the threshold value $dI_0/dt$ can be set as the time differential value of the motor electrical current value dI/dt. Also, the motor displacement X at which the time differential vale of the motor electrical current value dI/dt becomes equal to or greater than the threshold value $dI_0/dt$ can be determined as the initial contacting point of the pads 1 and the rotor 2. Then, by detecting the initial contacting point of the pads 1 and the rotor 2 in this manner, and adjusting the motor displacement command value, in other words the brake command value, an accurate braking control becomes possible. Particularly, the time differential value of the motor electrical current value dI/dt increases in a rectangular manner. Therefore, even if the threshold value $dI_0/dt$ is set as a relatively great value, as the pads 1 and the rotor 2 contact, the time differential value of the motor electrical current value dI/dt exceeds the threshold value $dI_0/dt$ securely and quickly.

Therefore, the initial contacting point of the pads 1 and the rotor 2 can be detected more accurately and quickly.

In this case also, the pads 1 and the rotor 2 do not contact each other in the subsequent drive control operation until the initial contacting point of the pads 1 and the rotor 2 detected in the preceding drive control operation is reached. The motor electrical current value I in the process E at the time of releasing the preceding drive control operation and the motor electrical current value I in the process A of the subsequent drive control operation are different by a predetermined electrical current value. Therefore, the time differential value dI/dt of the motor electrical current value at the time when the pads 1 separate apart from the rotor 2, while the motor displacement X is equal to or smaller than the initial contacting point of the pads 1 and the rotor 2 detected in the preceding drive control operation, is stored at the time of releasing the preceding drive control operation. A predetermined threshold value $dI_0/dt$ is set as a sum of the time differential value dI/dt of the motor electrical current value and a predetermined value, such that the threshold value $dI_0/dt$ is greater than the estimated time differential value dI/dt of the motor electrical current value in the process A of the subsequent drive control operation. Then, the initial contacting point of the pads 1 and the rotor 2 is determined as the motor displacement X at the time when the time differential value dI/dt of the motor electrical current value in the process A of the subsequent drive control operation becomes equal to or greater than the predetermined threshold value $dI_0/dt$. In this manner, the threshold value is set in accordance with the most recent drive control operation. Therefore, it is possible to detect the initial contacting point of the pads 1 and the rotor 2 even more precisely. Accordingly, an even more accurate braking control becomes possible.

Similarly, by virtue of the theory that the pads 1 and the rotor 2 do not contact each other in the subsequent drive control operation until the pads 1 and the rotor 2 reach the initial contacting point of the pads 1 and the rotor 2 detected in the preceding drive control operation, the predetermined threshold value $dI_0/dt$ can be set by detecting the time differential value dI/dt of the motor-electrical current value from the time when the drive control operation of the motor 3 is started in order to push the pads 1 toward the rotor 2 until the initial contacting point detected in the preceding drive control operation is reached, and by setting the predetermined threshold value $dI_0/dt$ as a sum of the time differential value dI/dt of the motor electrical current value and a predetermined constant. In this manner, the threshold value can be set in accordance with the current operational status of the motor 3. Therefore, it is possible to detect the initial contacting point of the pads 1 and the rotor 2 even more accurately. Therefore, it is possible to perform an even more accurate braking control.

In this case also, the time differential value dI/dt of the motor electrical current value should be ignored during the process $A_1$, during which the aforementioned motor starting current is running. It is preferable to detect the initial contacting point of the pads 1 and the rotor 2 after the time differential value dI/dt of the motor electrical current value enters a constant state, in other words the process $A_2$.

Next, another structure for detecting the initial contacting point of the pads 1 and the rotor 2 will now be explained.

Figure 7:
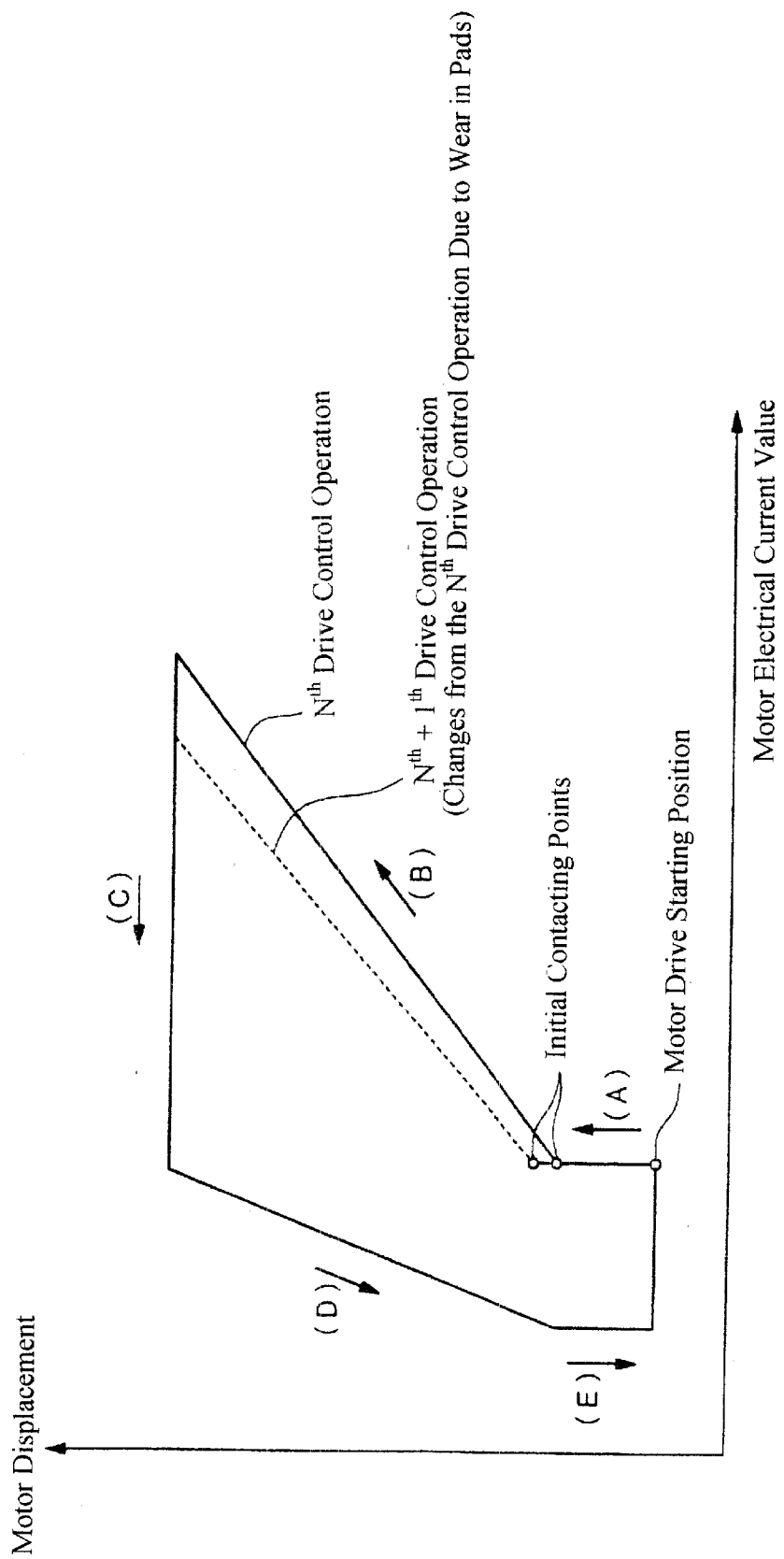
FIG. 7 is a graph schematically showing the relationship between the motor electrical current value and the motor displacement.

FIG. 7 is a schematic view of the motor electrical current value I and the motor displacement X during a drive control operation shown in FIG. 4. In the FIG. 7, the processes A–E correspond to the processes shown in the aforementioned FIG. 4. As seen from FIG. 7, when the process A and the process E are disregarded, each process has a different inclination of the motor electrical current value I with respect to the motor displacement. The value (=dI/dX) obtained by dividing the time differential value dI/dt of the motor electrical current value with the time differential value dX/dt of the motor displacement will now be described.

Figure 8:
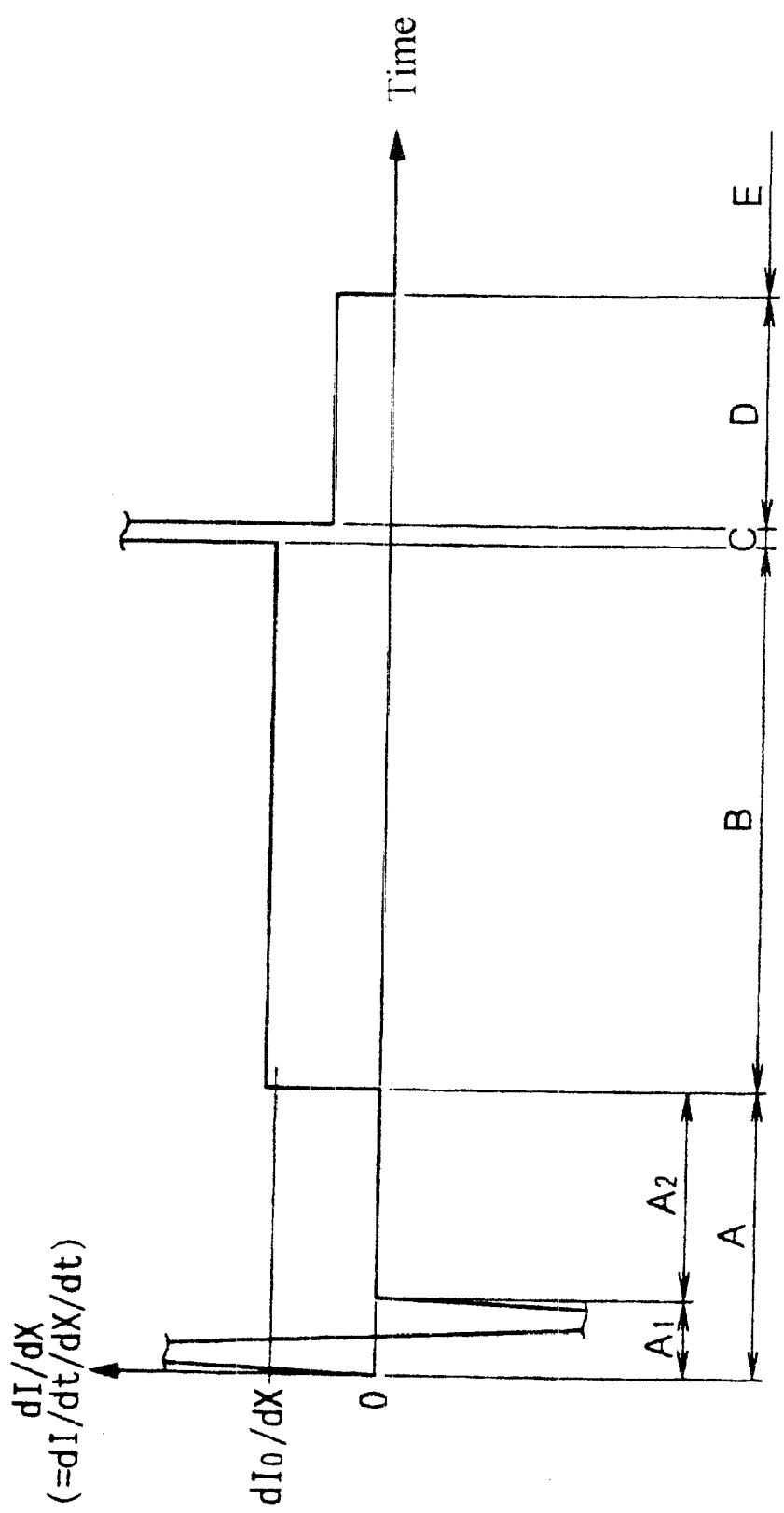
FIG. 8 is a timing graph showing of the time-series change in the value obtained by dividing the time differential value of the motor electrical current value with the time differential value of the motor displacement.

FIG. 8 shows a time series change of the value dI/dX during one drive control operation. The value dI/dX is obtained by dividing the time differential value of the motor electrical current value I with the time differential value of the motor displacement. In FIG. 8, the processes $A_1$, $A_2$, and A–E correspond to the processes in FIG. 4 and FIG. 5. As described above, during the process A (more precisely the process $A_2$), the motor electrical current value I is constant (that is, dI=0). During the process B, the motor electrical current value I and the motor displacement X increase linearly at a constant rate. Therefore, the value dI/dX increases in a rectangular manner at the time of a shift from the process A to the process B, in other words at the initial contacting point of the pads 1 and the rotor 2. Therefore, the initial contacting point of the pads 1 and the rotor 2 can be obtained by setting the threshold value $dI_0/dX$ as the value dI/dX, and determining the initial contacting point of the pads 1 and the rotor 2 as the motor displacement X at the time when the value dI/dX becomes equal to or greater than the threshold value $dI_0/dX$. By so detecting the initial contacting point of the pads 1 and the rotor 2 and adjusting the motor displacement command value, in other words the brake command value, an accurate braking control becomes possible. In particular, the value dI/dX increases in a rectangular manner regardless of the level of the increase in the braking force, in other words the level of the increase in the motor electrical current value I. Therefore, even if the threshold value $dI_0/dX$ is set as a relatively great value, the value dI/dX exceeds the threshold value $dI_0/dX$ certainly and quickly, when the pads 1 and the rotor 2 contact each other. Therefore, it is possible to detect the initial contacting point of the pads 1 and the rotor 2 accurately and quickly.

In this case also, the pads 1 and the rotor 2 do not contact each other in the subsequent drive control operation until they reach the initial contacting point of the pads 1 and the rotor 2 detected in the preceding drive control operation. Also, the motor electrical current value I during the process E at the time the preceding drive control operation is released differs from the motor electrical current value I at the beginning of the process A of the subsequent drive control operation by a predetermined electrical current value. Therefore, the value dI/dX at the time when the pads 1 separate apart from the rotor 2, while the motor displacement X is equal to or smaller than the initial contacting point of the pads 1 and the rotor 2 detected in the preceding drive control operation, is stored at the time of releasing the preceding drive control operation. A predetermined threshold value $dI_0/dX$ is set as a sum of the value dI/dX and a predetermined value, such that the threshold value $dI_0/dX$ is greater than the value dI/dX, which is obtained by dividing the estimated time differential value of the motor electrical current value I in the process A of the subsequent drive control operation with the time differential value of the motor displacement. Then, the initial contacting point of the pads 1 and the rotor 2 is determined as the motor displacement X at the time when the value dI/dX in the process A of the subsequent drive control operation, becomes equal to or greater than the predetermined threshold value $dI_0/dX$. In this manner, the threshold value is set in accordance with the most recent drive control operation. Therefore, it is possible to detect the initial contacting point of the pads 1 and the rotor 2 even more precisely. Accordingly, an even more accurate braking control becomes possible.

Figure 9:
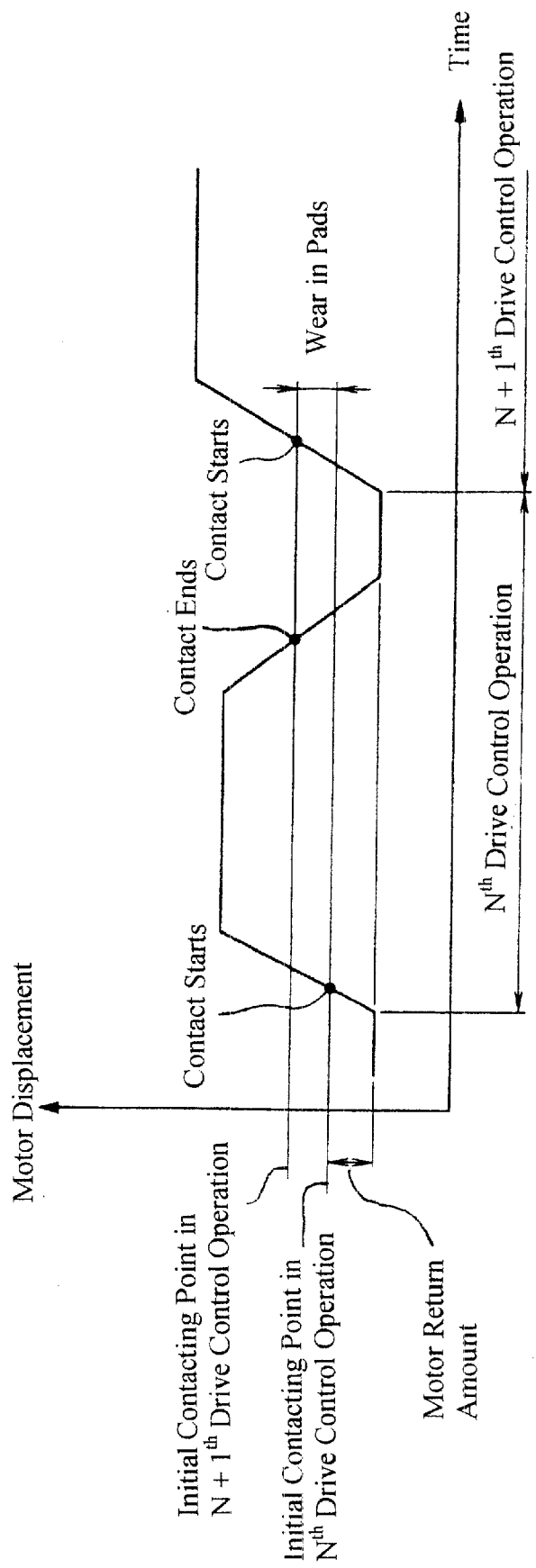
FIG. 9 is a timing graph showing of the time-series change in the motor displacement in the $N^{th}$ drive control operation and the $N+1^{th}$ drive control operation.

In the case where the value dI/dX, which is obtained by dividing the time differential value of the motor electrical current value I with the time differential value of the motor displacement X, is utilized, the predetermined threshold value $dI_0/dX$ can also be set in the following manner. That is, as described above, the pads 1 inevitably wear with one drive control operation. Therefore, as seen in FIG. 9, the $N^{th}$ drive control operation and the subsequent $N+1^{th}$ drive control operation have different initial contacting points (the initial contacting point becomes farther). Nonetheless, the initial contacting point of the pads 1 and the rotor 2 in the $N+1^{th}$ drive control operation is the same as the contact ending position (separation starting position) of the pads 1 and the rotor 2 in the preceding $N^{th}$ drive control operation.

In other words, the motor displacement that corresponds to the wear of the pads 1 during the drive control operation is absorbed by the aforementioned process C, in which pushing of the pads 1 ends as described in the explanation of FIG. 4. Therefore, the pads 1 hardly wear in the process D and thereafter. Accordingly, the contact ending position of the pads 1 and the rotor 2 in the aforementioned process D of the $N^{th}$ drive control operation is the same as the initial contacting point of the pads 1 and the rotor 2 in the $N+1^{th}$ drive control operation.

Figure 10:
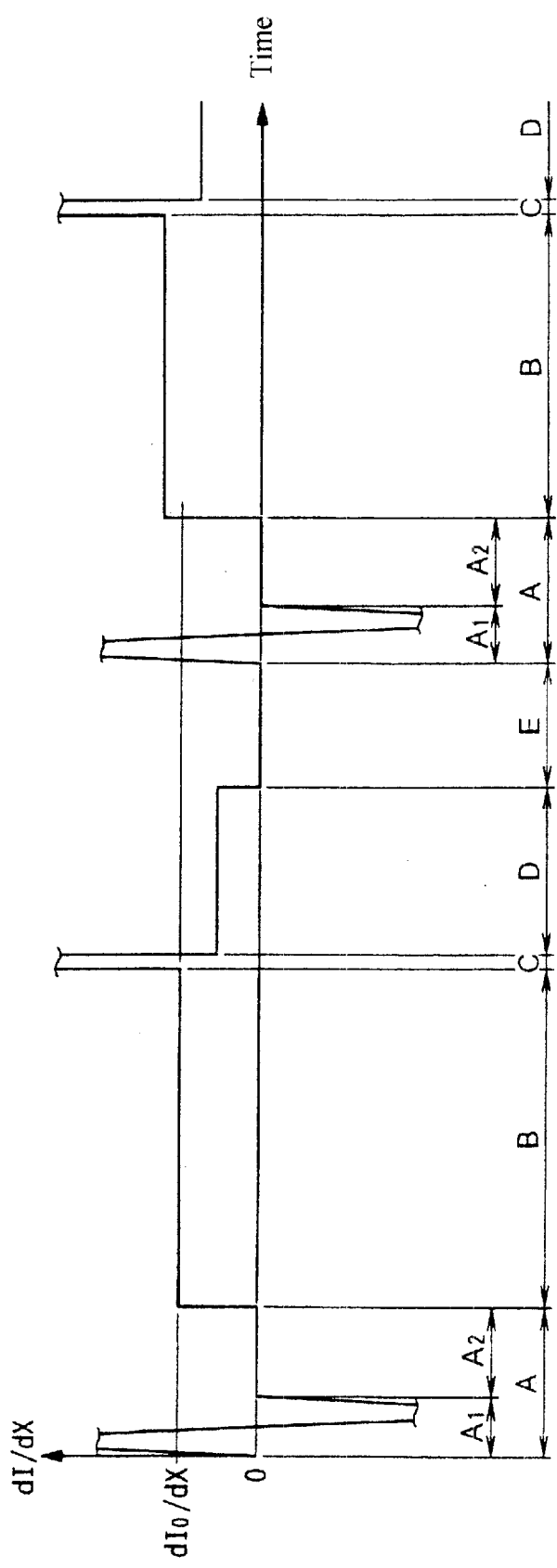
FIG. 10 is a timing graph showing of the time-series change in the value obtained by dividing the time differential value of the motor electrical current value with the time differential value of the motor displacement.

Referring back to FIG. 7 now, it has already been described that the initial contacting point of the pads 1 and the rotor 2 in the $N^{th}$ drive control operation is different from the initial contacting point of the pads 1 and the rotor 2 in the $N+1^{th}$ drive control operation. Similarly, the value dI/dX in the $N^{th}$ drive control operation is different from the value dI/dX in the $N+1^{th}$ drive control operation, wherein the value dI/dX is obtained by dividing the time differential value of the motor electrical current value I with the time differential value of the motor displacement X during the process B in the drive control operation. FIG. 10 shows the value dI/dX in the preceding drive control operation. FIG. 10 also shows the value dI/dX in the subsequent drive control operation in time-series. In the FIG. 10, the processes $A_1$, $A_2$, and A–E correspond to the processes shown in FIG. 4 and FIG. 5.

However, when the contact ending position of the pads 1 and the rotor 2 in the preceding drive control operation is the same as the initial contacting point of the pads 1 and the rotor 2 in the subsequent drive control operation, the value dI/dX obtained during the process D in the $N^{th}$ drive control operation and the value dI/dX obtained during the process B in the $N+1^{th}$ drive control operation are in the relationship of a ratio between the opposite rotational transmission rate and the normal rotational transmission rate of the motor 3. Therefore, the value dI/dX obtained during the process B in the subsequent drive control operation can be obtained by multiplying the value dI/dX obtained during the process D in the preceding drive control operation with the ratio of the transmission rate of the motor 3 in the pushing direction relative to the transmission rate in the separating direction. Therefore, by setting the predetermined $dI_0/dX$ as a value that is equivalent to or slightly smaller than the value dI/dX during the process B in the subsequent drive control operation, the initial contacting point of the pads 1 and the rotor 2 during the process A of the subsequent drive control operation can be determined as the motor displacement X at the time when the value dI/dX becomes equal to or greater than the predetermined threshold value $dI_0/dX$. In this manner, the threshold value is set in accordance with the most recent drive control operation. Therefore, it is possible to detect the initial contacting point of the pads 1 and the rotor 2 even more precisely. Accordingly, an even more accurate braking control becomes possible.

Similarly, by virtue of the theory that the pads 1 and the rotor 2 do not contact each other in the subsequent drive control operation until the pads 1 and the rotor 2 reach the initial contacting point of the pads 1 and the rotor 2 detected in the preceding drive control operation, the predetermined threshold value $dI_0/dX$ can be set by detecting the value $dI/dX$ from the time the drive control operation of the motor 3 is started to push the pads 1 toward the rotor 2 until the initial contacting point of the pads 1 and the rotor 2 detected in the preceding drive control operation is reached, and by setting the threshold value $dI_0/dX$ as a sum of the value $dI/dX$ and a predetermined constant. In this manner, the threshold value can be set in accordance with the current operational status of the motor 3. Therefore, it is possible to detect the initial contacting point of the pads 1 and the rotor 2 even more accurately. Therefore, it is possible to perform an even more accurate braking control.

In this case also, the value $dI/dX$ should be ignored during the process $A_1$, during which the aforementioned motor starting current is running. It is preferable to detect the initial contacting point of the pads 1 and the rotor 2 after the value $dI/dX$ enters a constant state, in other words the process $A_2$.

As described above, the electrical current value sensor 5 forms an electrical current value detection device and an operational status detection device of the present invention. Similarly, the displacement sensor 10 forms a displacement detection device and an operational status detection device. The step S7, step S9, step S10, and step S11 shown in the calculation process of FIG. 2 form a brake command value setting device. The control unit 4 in FIG. 1 forms a brake controlling device. The step S5 in the calculation process of FIG. 2 forms an initial contact position detection device. The step S8 in the calculation process of FIG. 2 forms an adjustment device.

Although the brake device itself is a disc brake in the aforementioned embodiments, the brake device is not limited to such case. The brake device itself can similarly be deployed as any other type of brake device. Furthermore, the driving device that pushes and separates the brake pad towards and apart from the brake rotor is not limited to a motor. Any device that can control the pushing force of the brake pad toward the brake rotor based on the magnitude of the electrical current value can be utilized. Also various calculation processing devices can be utilized instead of the microcomputer for the drive control device of the motor 3 or other driving device.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2000-269560. The entire disclosure of Japanese Patent Application No. 2000-269560 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents. Thus, the scope of the invention is not limited to the disclosed embodiments.

What is claimed is:

1. A braking force control apparatus comprising:
   a driving device operatively configured to move a brake pad towards and away from a brake rotor;
   an operational status detector arranged to detect an operational status of said driving device;
   an initial contact position detector arranged to detect an initial contacting point between the brake pad and the brake rotor based on said operational status of said driving device detected by said operational status detector, when said driving device moves the brake pad toward the brake rotor,
   a brake control unit operatively coupled to said driving device and said operational status detector to control said driving device, said brake control unit including a brake command value setting portion that is configured to set a brake command value to control said driving device based on a pedal operation amount, said brake control unit including an adjustment portion configured to subsequently adjust said brake command value based on said initial contacting point between the brake pad and the brake rotor detected by said initial contact position detector.

2. The braking force control apparatus as set forth in claim 1, wherein
   said brake command value setting mechanism drives said driving device at a constant speed until said initial contact position detector detects said initial contacting point between the brake pad and the brake rotor.

3. The braking force control apparatus as set forth in claim 1, wherein
   said initial contact position detector ignores said operational status of said driving device for a predetermined period of time after said brake control unit starts driving said driving device to move the brake pad toward the brake rotor, said operational status being detected by said operational status detector to detect said initial contacting point between the brake pad and the brake rotor.

4. The braking force control apparatus as set forth in claim 1, wherein
   said driving device is an electrically operated motor.

5. The braking force control apparatus as set forth in claim 1, wherein
   said operational status detector includes an electrical current value sensor that is arranged to detect an electrical current value of said driving device and a displacement sensor that is arranged to detect a displacement value of said driving device.

6. The braking force control apparatus as set forth in claim 5, wherein
   said initial contact position detector detects said initial contacting point between the brake pad and the brake rotor as said displacement value of said driving device detected by said displacement sensor when said electrical current value of said driving device detected by said electrical current value sensor becomes equal to or greater than a threshold value for detecting contact between the brake pad and the brake rotor.

7. The braking force control apparatus as set forth in claim 6, wherein said initial contact position detector sets said threshold value for a subsequent drive control operation based on said electrical current value of said driving device occurring when the brake pad separates apart from the brake rotor and while said displacement value of said driving device is equal to or smaller than said initial contacting point of the brake pad and the brake rotor detected in a preceding drive control operation.

8. The braking force control apparatus as set forth in claim 6, wherein
said initial contact position detector sets said threshold value for a subsequent drive control operation based on said electrical current value of said driving device occurring when a preceding drive control operation of said driving device starts to move the brake pad toward the brake rotor until said initial contacting point between the brake pad and the brake rotor detected in said preceding drive control operation is reached.

9. The braking force control apparatus as set forth in claim 5, wherein
said initial contact position detector detects said initial contacting point between the brake pad and the brake rotor as said displacement value of said driving device detected by said displacement sensor when a time differential value of said electrical current value of said driving device detected by said electrical current value sensor becomes equal to or greater than a threshold value for detecting contact between the brake pad and the brake rotor.

10. The braking force control apparatus as set forth in claim 9, wherein
said initial contact position detector sets said threshold value for a subsequent drive control operation based on said time differential value of said electrical current value of said driving device occurring when the brake pad separates apart from the brake rotor and while said displacement value of said driving device is equal to or smaller than said initial contacting point of the brake pad and the brake rotor detected in a preceding drive control operation.

11. The braking force control apparatus as set forth in claim 9, wherein
said initial contact position detector sets said threshold value for a subsequent drive control operation based on said time differential value of said electrical current value of said driving device occurring when said drive control operation of said driving device starts to move the brake pad toward the brake rotor until said initial contacting point of the brake pad and the brake rotor detected in a preceding drive control operation is reached.

12. The braking force control apparatus as set forth in claim 5, wherein
said initial contact position detector detects said initial contacting point between the brake pad and the brake rotor as said displacement value of said driving device detected by said displacement sensor when a value obtained by dividing a time differential value of said electrical current value of said driving device detected by said electrical current value sensor with a time differential value of said displacement value of said driving device detected by said displacement sensor becomes equal to or greater than a threshold value for detecting contact between the brake pad and the brake rotor.

13. The braking force control apparatus as set forth in claim 12, wherein
said initial contact position detector sets said threshold value for a subsequent drive control operation based on said value obtained by dividing said time differential value of said electrical current value of said driving device with said time differential value of said displacement value of said driving device occurring when the brake pad separates apart from the brake rotor and while said displacement value of said driving device is equal to or smaller than said initial contacting point of the brake pad and the brake rotor detected during a preceding drive control operation.

14. The braking force control apparatus as set forth in claim 12, wherein
said initial contact position detector sets said threshold value for a subsequent drive control operation based on a value obtained by multiplying a ratio of a transmission efficiency rate of said driving device in an engaging direction relative to a transmission efficiency rate in a separating direction, and said value obtained by dividing with said time differential value of said displacement value of said driving device with said time differential value of said electrical current value of said driving device immediately before the brake pad separates apart from the brake rotor and while said displacement value of said driving device is equal to or greater than said initial contacting point of the brake pad and the brake rotor detected during a preceding drive control operation.

15. The braking force control apparatus as set forth in claim 12, wherein
said initial contact position detector sets said threshold value based on said value obtained by dividing said time differential value of said electrical current value of said driving device with said time differential value of said displacement value of said driving device occurring when said drive control operation of said driving device starts to move the brake pad toward the brake rotor until said initial contacting point between the brake pad and the brake rotor is reached.

16. A method of controlling a braking force of a braking device comprising:
moving a brake pad towards and away from a brake rotor using a driving device,
detecting an operational status of said driving device;
setting a brake command value based on a pedal operation amount;
controlling said driving device based on said brake command value;
detecting an initial contacting point between said brake pad and said brake rotor based on said operational status of said driving device being detected, when said driving device moves the brake pad toward the brake rotor; and
subsequently adjusting said brake command value based on said initial contacting point of said brake pad and said brake rotor being detected.

17. The method as set forth in claim 16, further comprising
operating said driving device at a constant speed until detection of said initial contacting point between the brake pad and the brake rotor.

18. The method as set forth in claim 16, further comprising
ignoring said operational status of said driving device for a predetermined period of time after operating said driving device to move the brake pad toward the brake rotor, and using said operational status to detect said initial contacting point between the brake pad and the brake rotor.

19. The method as set forth in claim 16, further comprising using an electrical current value sensor that is arranged to detect an electrical current value of said driving device and a displacement sensor that is arranged to detect a displacement value of said driving device to determine said operational status of said driving device.

20. A braking force control apparatus comprising:

motor means for moving a brake pad towards and away from a brake rotor;

operational status detection means for detecting an operational status of said motor means;

brake command value setting means for setting a brake command value based on a pedal operation amount;

brake control means for drive controlling said motor means based on the brake command value set by said brake command value setting means;

initial contact position detection means for detecting an initial contacting point between the brake pad and the brake rotor based on the operational status of said motor means detected by said operational status detection means, when said motor means moves the brake pad toward the brake rotor; and adjustment means for subsequently adjusting said brake command value based on said initial contacting point of the brake pad and the brake rotor detected by said initial contact position detection means.

* * * * *